United States Patent
Uvarov et al.

(10) Patent No.: US 9,900,527 B2
(45) Date of Patent: Feb. 20, 2018

(54) ENHANCED HIGH DYNAMIC RANGE

(71) Applicant: OMNIVISION TECHNOLOGIES, INC., Santa Clara, CA (US)

(72) Inventors: Timofey Uvarov, Milpitas, CA (US); Sarvesh Swami, San Jose, CA (US); Donghui Wu, San Mateo, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 85 days.

(21) Appl. No.: 15/064,546

(22) Filed: Mar. 8, 2016

(65) Prior Publication Data

US 2017/0264839 A1 Sep. 14, 2017

(51) Int. Cl.
*H04N 5/355* (2011.01)
*H04N 5/265* (2006.01)
*G06T 5/00* (2006.01)
*H04N 5/378* (2011.01)

(52) U.S. Cl.
CPC ......... *H04N 5/35581* (2013.01); *G06T 5/009* (2013.01); *H04N 5/265* (2013.01); *H04N 5/378* (2013.01); *G06T 2207/20208* (2013.01)

(58) Field of Classification Search
CPC .... H04N 5/35581; H04N 5/265; H04N 5/378; G06T 5/009; G05T 2207/20208
See application file for complete search history.

(56) References Cited

U.S. PATENT DOCUMENTS

| 8,346,002 | B2 * | 1/2013 | Wei | G06T 5/008 382/239 |
| 8,860,836 | B2 * | 10/2014 | Thabuis | H04N 5/378 348/222.1 |
| 9,324,137 | B2 * | 4/2016 | Huang | H04N 19/63 |
| 9,697,592 | B1 * | 7/2017 | Dai | G06T 5/009 |
| 2012/0189206 | A1 * | 7/2012 | Iketani | G06T 5/004 382/190 |

* cited by examiner

*Primary Examiner* — Amy Hsu
(74) *Attorney, Agent, or Firm* — Christensen O'Connor Johnson Kindness PLLC (57) ABSTRACT

An imaging system includes an image sensor configured to capture a sequence of images including at least one low dynamic range (LDR) image and at least one high dynamic range (HDR) image. The imaging system also includes readout circuitry. The readout circuitry is coupled to read out image data captured by the image sensor. A processor is coupled to the readout circuitry to receive image data corresponding to the at least one LDR image and image data corresponding to the at least one HDR image. The processor is configured to combine high frequency image data extracted from image data corresponding to the at least one LDR image with low frequency image data extracted from image data corresponding to the at least one HDR image to form a composite image.

18 Claims, 8 Drawing Sheets

ENHANCED HIGH DYNAMIC RANGE

TECHNICAL FIELD

This disclosure relates generally to image sensor operation and in particular but not exclusively, relates to enhanced high dynamic range.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

High dynamic range (HDR) refers to techniques used to expand the range of luminosity in cameras/image sensors. The goal is to have the camera capture a similar rage of luminance as the human eye typically sees. HDR cameras can display a greater range of luminance levels than cameras using more traditional methods. This is most evident in photography of image scenes containing very bright light contrasted with extreme shade or darkness.

One of the most common ways to achieve an HDR image is by sequentially capturing and stacking several different narrow range exposures of the same image scene. However, this technique may result in image distortion if the subject of the image moves during image capture (such as in wildlife photography or the like). Furthermore, alternative methods of HDR image acquisition may require expensive equipment to achieve the same result.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for enhanced high dynamic range imaging are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It is worth noting that specific elements of circuitry/logic may be substituted for logically equivalent or analogous circuitry and may be implemented in both software and hardware systems.

Figure 1:
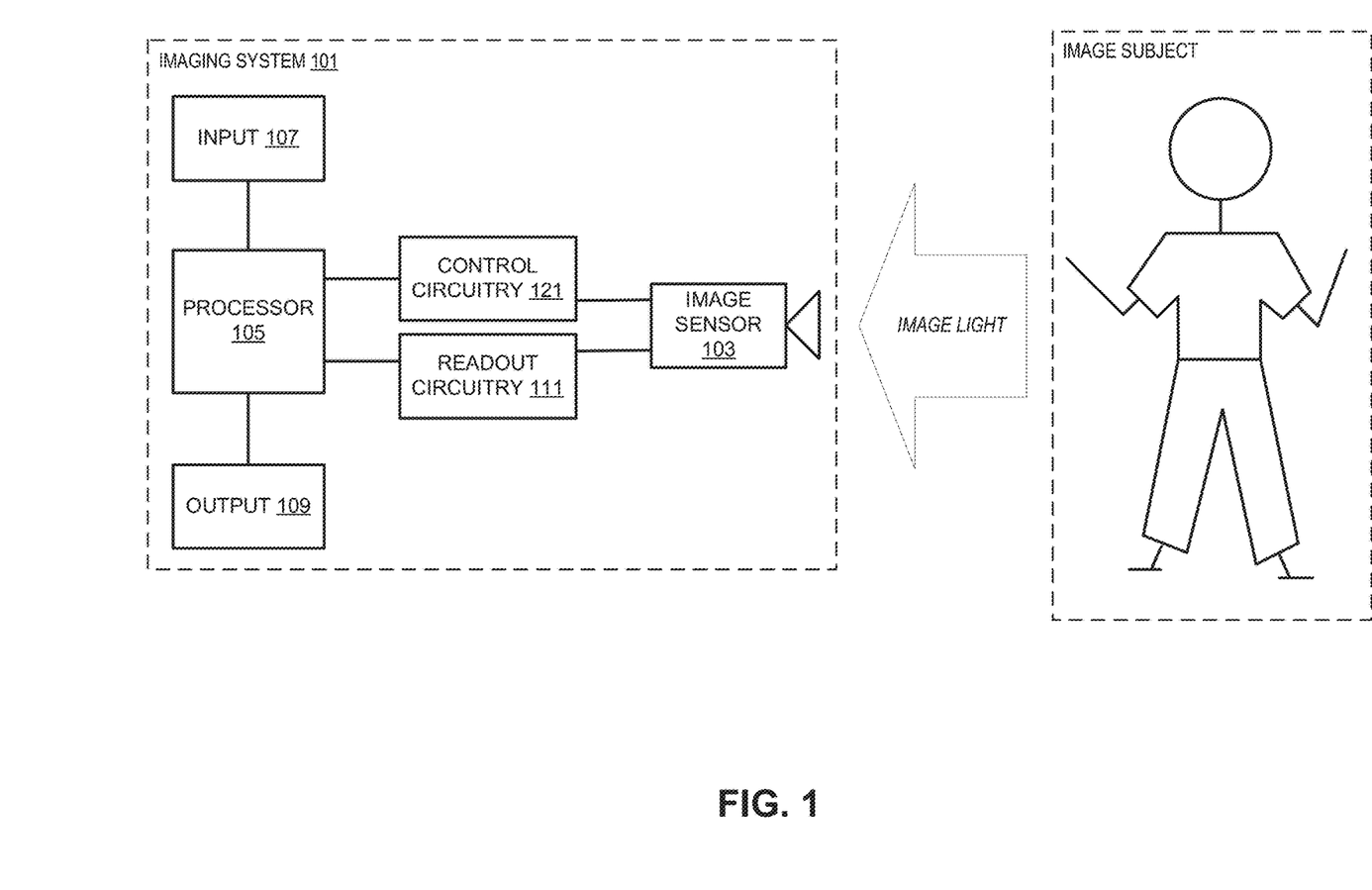
FIG. 1 depicts an example imaging system, in accordance with the teachings of the present invention.

FIG. 1 depicts an example imaging system 101. Imaging system 101 includes: image sensor 103, processor 105, input 107, output 109, readout circuitry 111, and control circuitry 121. Image sensor 103 is configured to capture a sequence of images including at least one low dynamic range (LDR) image and at least one high dynamic range (HDR) image. In the depicted example, this may be at least one HDR image and at least one LDR image of the image subject (i.e., the person). Control circuitry 121 is coupled to image sensor 103 to control LDR image capture and HDR image capture, and readout circuitry 111 is coupled to read out image data (e.g., image data corresponding to the LDR and HDR images of the image subject) captured by image sensor 103. Processor 105 is coupled to readout circuitry 111 to receive image data corresponding to the at least one LDR image, and image data corresponding to the at least one HDR image.

Processor 105 is configured to combine high frequency image data (extracted from image data corresponding to the at least one LDR image) with low frequency image data (extracted from image data corresponding to the at least one HDR image). Processor 105 is also configured to generate a composite image from the combined low frequency image data and high frequency image data. Data output 109 is coupled to processor 105 to receive the composite image. In several examples, data output 109 may include a display, HDMI port, USB port, printer, or any other suitable hardware/software.

In the depicted example, processor 105 is configured to generate a mix mask, and the mix mask governs placement of the high frequency image data and the low frequency image data in the composite image. In one example, forming the mix mask includes using processor 105 to: (1) determine differences between the low frequency image data and the high frequency data; (2) determine portions of the high frequency image data that are under-saturated; and (3) determine portions of the high frequency image data that are over-saturated. In this example, the mix mask shows differences between the low frequency image data and the high frequency image data, and the mix mask shows portions of the high frequency image data that are over saturated and portions of the high frequency image data that are under saturated (see infra discussion of FIG. 8).

It should be noted that in one example, the portions of the mix mask that show differences between the low frequency image data and the high frequency image data are expanded. In other words, the portions of the mix mask that show differences between the high frequency image data and the low frequency image data may extend nominally beyond the bounds of the actual difference regions to ensure these areas are cleanly removed from the final composite image. For example, if the subject of the image moves between capture of the LDR image and capture of the HDR image, the mix mask will note the differences between these two images (e.g., by placing white pixel(s) in the areas that are different). Then the mix mask may add slightly more white pixels than are required to fill the difference region, in order to make sure the difference region is cleanly removed from the final composite image.

In one example, generating the composite image includes using the mix mask to: (1) correct portions of the high frequency image data that are over saturated using the low frequency image data; (2) correct portions of the high frequency image data that are under saturated using the low frequency image data; and (3) correct differences between the low frequency image data and the high frequency image data using the low frequency image data. In other words, processor 105 may examine the areas of high frequency image data that are over saturated and under saturated (e.g., luminance values are greater than/less than a threshold value) and may also determine which parts of the images in the sequence of images are different (e.g., if the subject of the image moved between image frames). Processor 105 will then make the mix mask illustrate these areas of over saturation, under saturation, and difference. Subsequently, processor 105 will use the low frequency image data (i.e., from the at least one HDR image) to correct the high frequency image (i.e., from the at least one LDR image).

As previously stated, processor 105 is used to combine the high frequency image data and the low frequency image data. In one example, this may include forming high resolution luminance image data, and low resolution luminance image data, and using these two types of image data to from the final composite image. The high resolution luminance image data may include image data corresponding to the at least one LDR image and image data corresponding to the at least one HDR image, and the low resolution luminance image data may include image data corresponding to the at least one HDR image. In one example, high resolution luminance image data is achieved by applying a high-pass filter to the image data corresponding to the at least one LDR image, and applying a low-pass filter to the image data corresponding to the at least one HDR image. In another or the same example, the low resolution luminance image data is achieved by sharpening the image data corresponding to the at least one HDR image.

In one or more examples, several mixing steps are undertaken to form the final combined high resolution image. First, the high resolution luminance image data is combined with first color data (from the image data corresponding to the at least one LDR image) to form high resolution color image data. Similarly, the low resolution luminance image data is combined with second color data (from the image data corresponding to the at least one HDR image) to form low resolution color image data. Then, the composite image may then be generated by combining the high resolution color image data and the low resolution color image data, in accordance with the parameters of the mix mask.

To summarize the example depicted in FIG. 1, imaging system 101 is used to create high quality composite images by forming a combined LDR and HDR image. Image sensor 103 may capture an LDR image and an HDR image. Likely, the LDR image will depict lots of detail about the image subject, but certain areas of the image will be washed out due to the limited dynamic range of the LDR image (e.g., an area with very dark shadow, or an area with very bright light may not be properly resolved in the LDR image). Conversely, the HDR image will show less mid-range detail than the LDR image, but will not have washed out dark/bright spots. Furthermore, there may be differences between the LDR image and the HDR image because the subject of the image moved between image acquisitions.

Imaging system 101 eliminates both of the aforementioned image defects. First, imaging system 101 replaces the washed out portions of the LDR image with fully resolved portions of the HDR image. Second, imaging system 101 removes portions of the LDR image that are different than the same portions of the HDR image. Thus, imaging system 101 may create a composite image that (1) lacks motion-induced image distortion and (2) combines the mid-range detail of an LDR image and the broad luminance spectrum of an HDR image.

Figure 2:
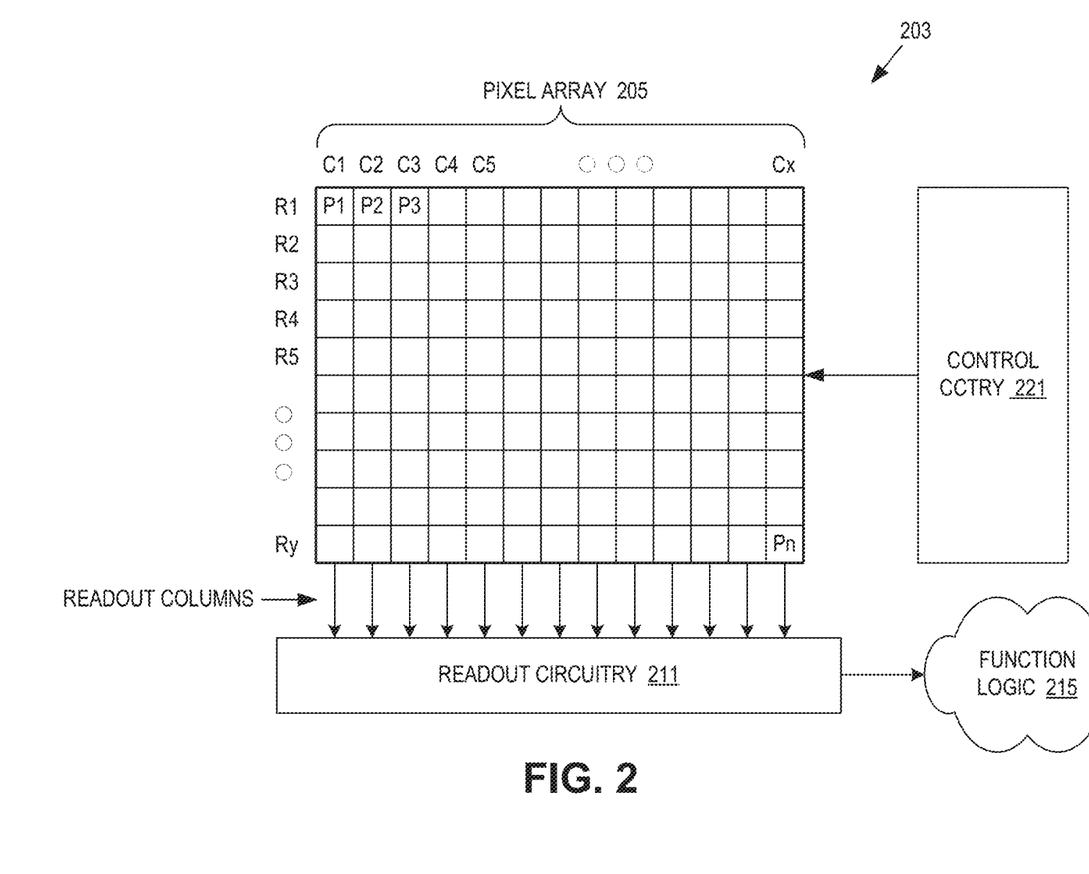
FIG. 2 illustrates an example image sensor, in accordance with the teachings of the present invention.

FIG. 2 illustrates an example image sensor 203. Image sensor 203 includes pixel array 205, control circuitry 221, readout circuitry 211, and function logic 215. In one example, pixel array 205 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc.

In one example, after each image sensor photodiode/pixel in pixel array 205 has acquired its image data or image charge, the image data is readout by readout circuitry 211 and then transferred to function logic 215. Readout circuitry 211 may be coupled to readout image data from the plurality of photodiodes in pixel array 205. In various examples, readout circuitry 211 may include amplification circuitry, analog-to-digital (ADC) conversion circuitry, or otherwise. Function logic 215 may simply store the image data or even manipulate the image data by applying post image effects. In one example, function logic may upscale the HDR images prior to performing substantive image processing. In another or the same example, function logic may be contained in the processor (e.g., processor 105).

In one example, control circuitry 221 is coupled to pixel array 205 to control operation of the plurality of photodiodes in pixel array 205. For example, control circuitry 221 may generate a shutter signal for controlling image acquisition. In one example, the shutter signal is a global shutter signal for simultaneously enabling all pixels within pixel array 205 to simultaneously capture their respective image data during a single acquisition window. In another example, image acquisition is synchronized with lighting effects such as a flash.

In one or more examples, capturing the sequence of image data includes using image sensor 203 to capture N HDR images in a first frame and one LDR image in a second fame. The N HDR images are $1/N^{th}$ a size of the one LDR image and the N HDR images may be upscaled to the size of the one LDR image. This may be achieved by grouping pixels (e.g., pixels P1, P2 . . . , Pn) in pixel array 205 to capture different luminance ranges. For example, pixels P1-Pn may be organized into groups of four pixels, where a first group of four pixels has a dark color filter layer, a second group of four pixels has a medium dark color filter layer, a third group of four pixels has a medium light color filter layer, and a fourth group of four pixels has a light color filter layer. This pattern may be repeated across pixel array 205. Thus, the four groups of four pixels will each capture a unique range of luminance data which can be used to form an HDR image. However, using this technique, the HDR image is $\frac{1}{4}^{th}$ the size of the one LDR image (where all pixels are used to capture the single LDR image). Accordingly, the HDR image must be upscaled to the size of the LDR image in order to be combined with the LDR image.

In one example, imaging sensor 203 may be included in a digital camera, cell phone, laptop computer, or the like. Additionally, imaging sensor 203 may be coupled to other pieces of hardware such as a processor (e.g., processor 105), memory elements, lighting/flash, and/or display. Other pieces of hardware may deliver instructions to imaging sensor 203, extract image data from imaging sensor 203, manipulate image data supplied by imaging sensor 203, or reset image data in imaging sensor 203.

Figure 3:
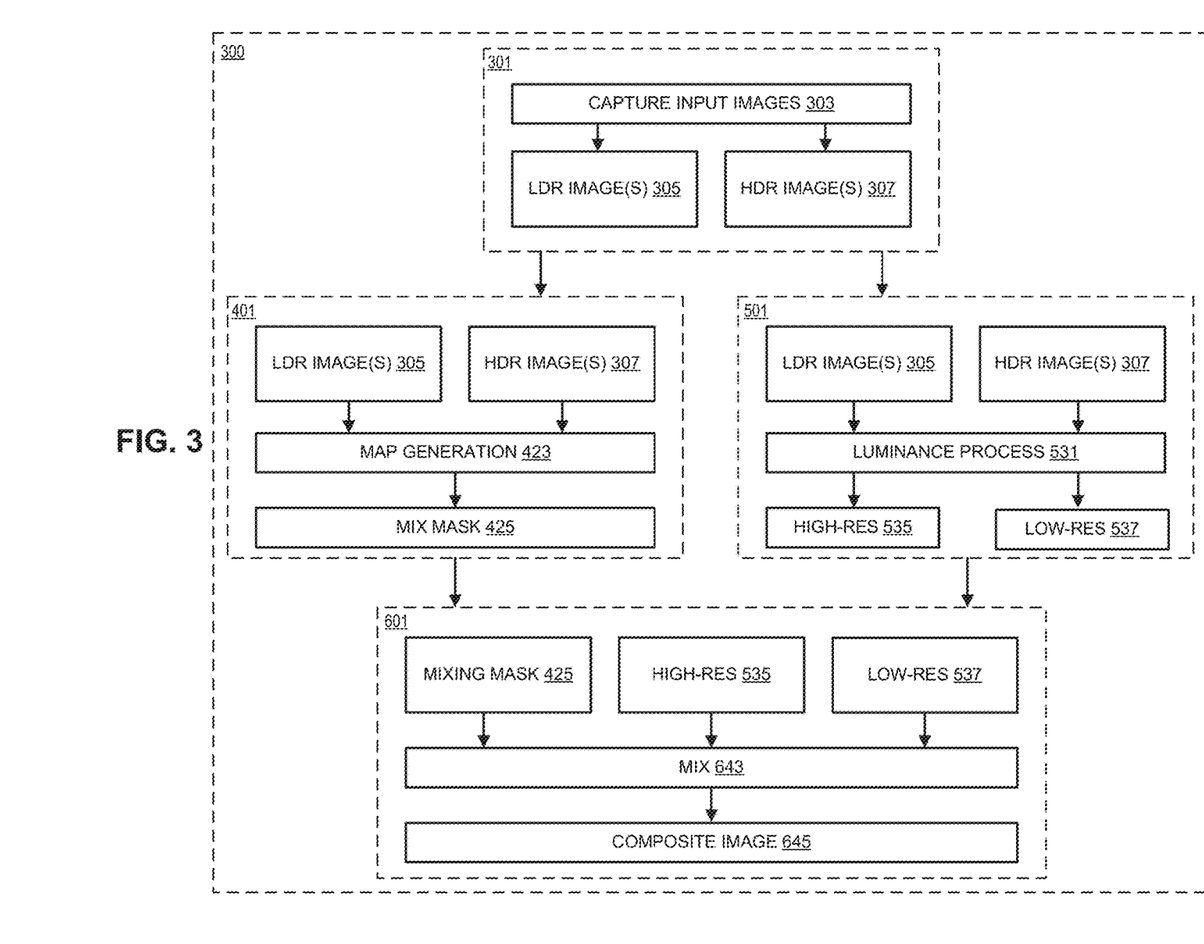
FIG. 3 depicts an example method of image sensor operation, in accordance with the teachings of the present invention.

FIG. 3 depicts an example method 300 of image sensor operation. The order in which some or all process blocks appear in method 300 should not be deemed limiting. Rather, one of ordinary skill in the art having the benefit of the present disclosure will understand that some of method 300 may be executed in a variety of orders not illustrated, or even in parallel. It is worth noting that method 300 depicts a highly simplified (high level) example in accordance with the teachings of the present invention. Portions of the method will be described in greater detail in connection with discussion of FIGS. 4-6.

Method 300 includes process blocks 301, 401, 501 and 601. Each of process blocks 301, 401, 501 and 601 correspond to a sub-method used to form one or more component(s) to render final composite image 645.

Process block 301 shows capturing input images (corresponding to a sequence of image data) with an image sensor (e.g., image sensor 103). The sequence of image data includes image data corresponding to at least one low dynamic range (LDR) image 305 and image data corresponding to at least one high dynamic range (HDR) image 307. Image acquisition may be achieved via the techniques described in connection with FIG. 2 or any other feasible imaging method. It should be noted that process block 301 will not be discussed further, since the capturing of the LDR and HDR images has been discussed elsewhere (i.e., in connection with FIG. 2).

Process block 401 depicts forming a mix mask 425 via a map generation process 423. Specifically, image data from the image sensor is extracted via readout circuitry, and the image data is received with a processor which generates the mix mask 425. The mix mask 425 is used to control placement of LDR image data and HDR image data in the final composite image.

Process block 501 depicts forming high resolution luminance image data 535 and low resolution luminance image data 357 using LDR image(s) 305 and HDR image(s) 307. High resolution luminance image data 535 and low resolution luminance image data 537 are combined in accordance with mix mask 425 to form the composite image.

Process block 601 depicts combining the high resolution luminance image data 535 and a low resolution luminance image data 537 in accordance with the mix mask 425 to form an enhanced composite image 645. Composite image 645 has the high frequency detail of an LDR image with the wide luminance range of an HDR image.

Figure 4:
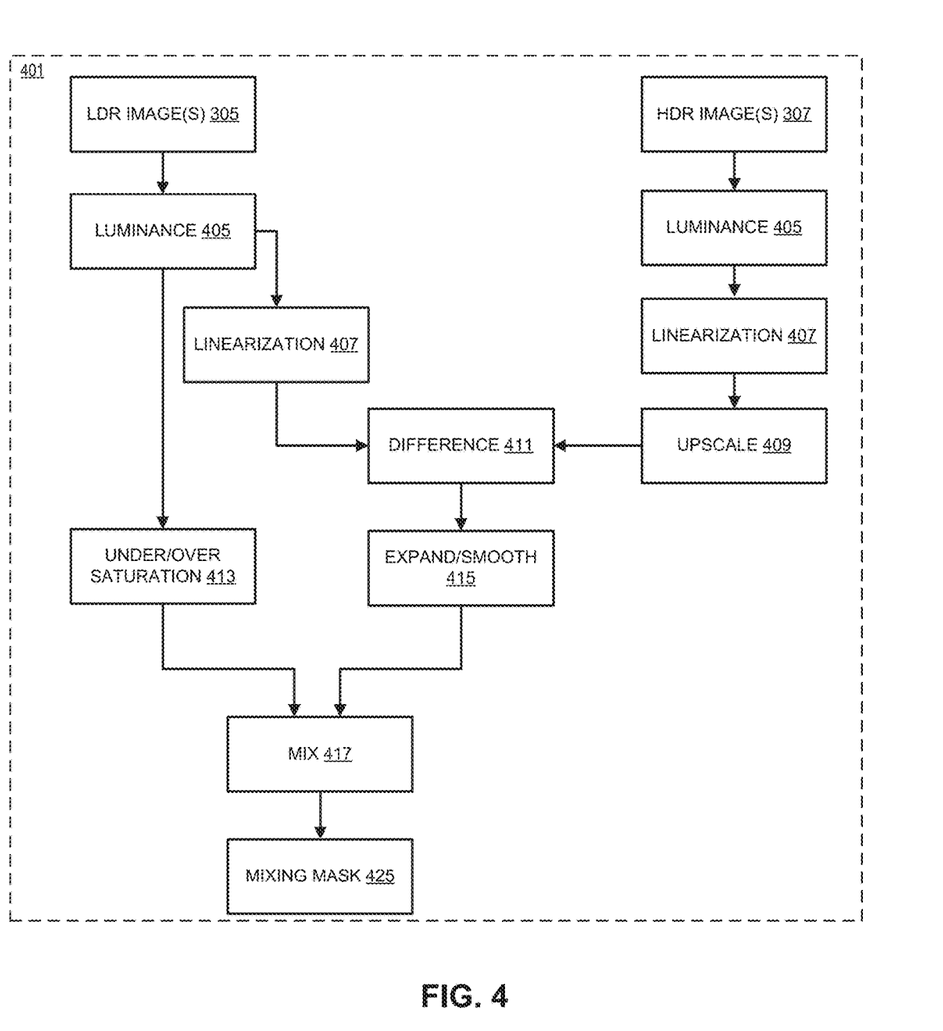
FIG. 4 depicts a portion of the example method of FIG. 3, in accordance with the teachings of the present invention.

FIG. 4 depicts a portion of the example method of FIG. 3. Specifically, FIG. 4 depicts process block 401. Within process block 401, mix mask 425 is generated and mix mask 425 governs placement of the high resolution luminance image data 535 and the low resolution luminance image data 537 in composite image 645.

First, one or more LDR image(s) 305 and one or more HDR image(s) 307 are sent to the processor (e.g., processor 105) from the image sensor (e.g., image sensor 103). In process blocks 405, the image data from the one or more LDR image(s) 305 and one or more HDR image(s) is converted into luminance data. In some examples, the conversion to luminance data appreciably reduces the amount of processing power needed to render the final composite image 645. After the luminance signal is extracted from both HDR and LDR image data, the luminance image data is linearized in blocks 407. In one example, this may be accomplished via a pre-defined lookup table. In the depicted example, the HDR luminance image data is upscaled in process block 409 because the HDR images used are smaller than the LDR image (see supra discussion of FIG. 2). Upscaling may be accomplished via liner interpolation or the like.

Once the LDR and HDR image data is converted into luminance data and properly scaled, mix mask 425 can be created. In block 411, HDR luminance image data is subtracted from the LDR luminance image data in order to determine differences between the images. This allows for the mixing mask to correct for image distortion due to movement between images. In the depicted example, process block 415 expands and smooths portions of the mix mask that show differences between the HDR luminance image data and the LDR luminance image data. This may help to cleanly remove movement blur from the final composite image 645.

In process block 413 an under/over saturation procedure is applied to the LDR image. If a pixel value of the LDR image is under/over a threshold value (e.g., too dark or too bright) this will be noted in the mixing mask. Accordingly, in process block 417 the information obtained by the under/oversaturation process is combined with the information from the difference process to form mix mask 425. Thus mix mask 425 may show differences between the LDR image data and the HDR image data, along with portions of the LDR image data that are over saturated and portions of the LDR image data that are under saturated.

Figure 5:
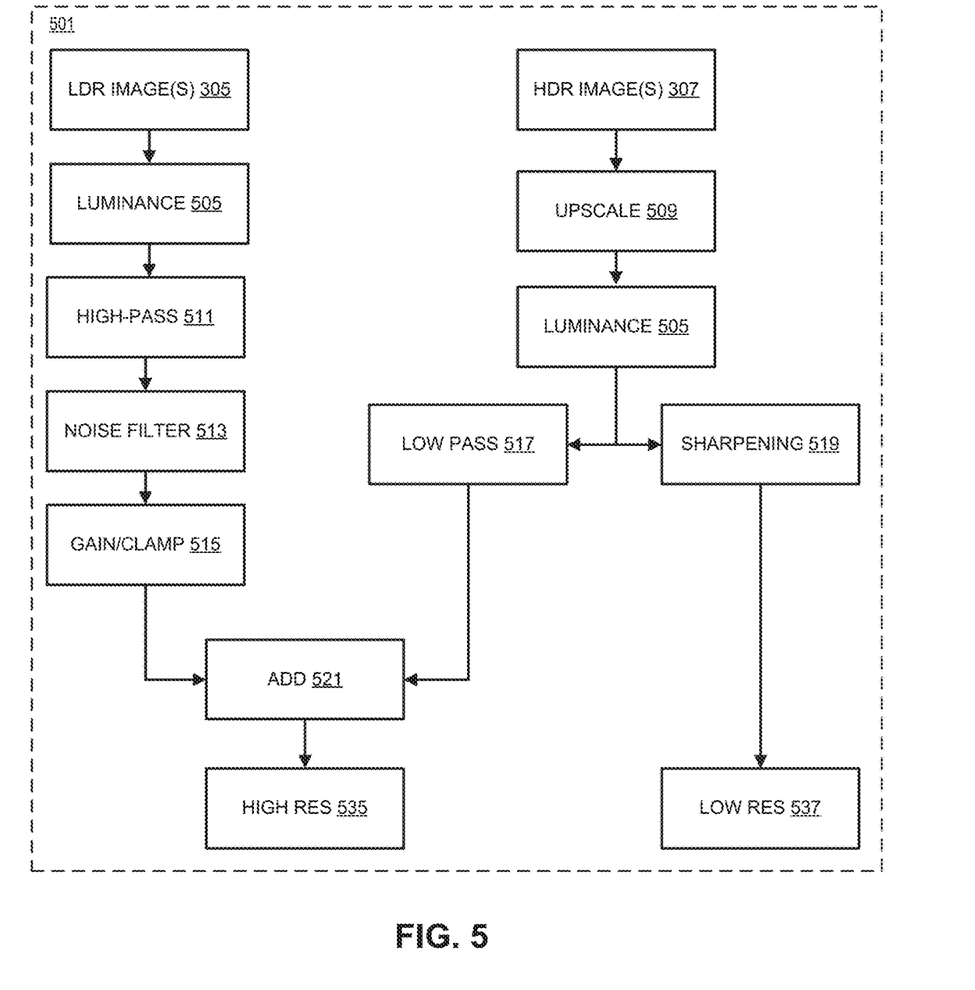
FIG. 5 depicts a portion of the example method of FIG. 3, in accordance with the teachings of the present invention.

FIG. 5 depicts a portion of the example method of FIG. 3. Specifically, FIG. 5 depicts process block 501 in which high resolution luminance image data 535 and low resolution luminance image data 537 are formed. High resolution luminance image data 535 and low resolution luminance image data 537 are used to form composite image 645.

In process blocks 505, the processor receives LDR image(s) 305 and HDR image(s) 307 and converts them to luminance data. It should be noted that LDR image(s) 305 and HDR image(s) 307 may have already been converted into luminance data in process blocks 405 (see FIG. 4), in which case block 505 may be omitted. Process block 509 depicts upscaling of HDR image(s) 307 before converting HDR image 307 into luminance data. However, this process block may also be redundant as HDR image(s) 307 may already been upscaled to generate the mix mask (see supra FIG. 4 block 409).

In process block 511, once LDR image(s) 305 are converted into luminance image data, a high pass filter is applied. In one example, LDR image data may be high pass filtered by subtracting the low pass signal (e.g., low pass signal in process block 517) from the LDR luminance image data. In process block 513, a noise filter may be applied to remove image noise. Subsequently, gain/clamp is applied in process block 515.

Similarly, in process block 517, once HDR image(s) 307 is converted into luminance image data and upscaled, a low pass filter may be applied to the HDR luminance image data to achieve a low frequency signal. Additionally, HDR luminance image data may be sharpened in process block 519 to achieve low resolution luminance image data 537.

In process block 521, the high frequency luminance signal containing details of the image subject captured in the LDR image(s) are added to the low frequency signal extracted from the HDR image(s) 307. This results in high resolution luminace image data 535. High resolution luminance image data 535 and low resolution luminace image data 537 are subsequently combined to form composite image 645.

Figure 6:
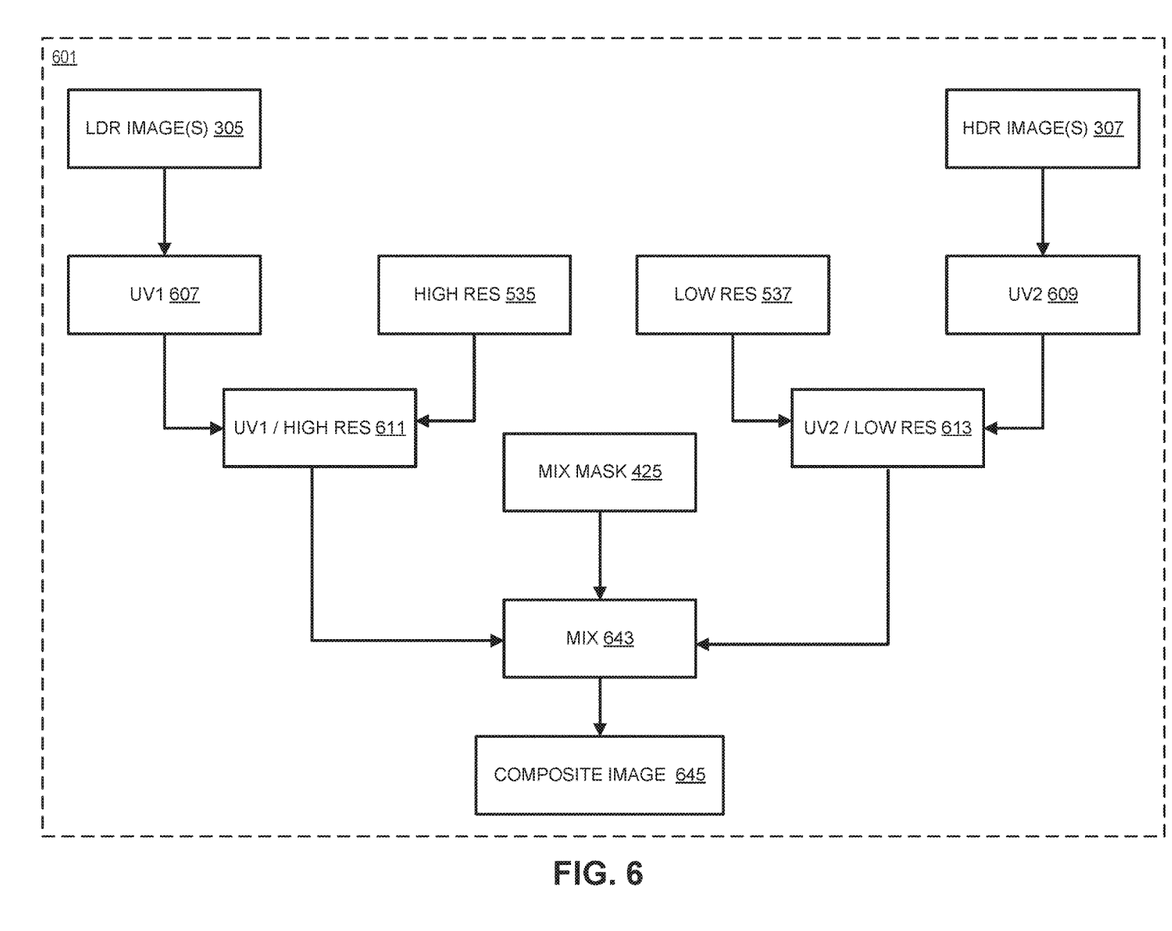
FIG. 6 depicts a portion of the example method of FIG. 3, in accordance with the teachings of the present invention.

FIG. 6 depicts a portion of the example method of FIG. 3. Specifically, FIG. 6 depicts mixing high resolution luminance image data 535, low resolution luminance image data 537, and chrominance image data in accordance with the mix mask 425 to form composite image 645.

In process blocks 607 and 609, the chrominance (color) signal is extracted from the LDR image(s) 305 and HDR image(s) 307, respectively. In one example, the color signal from the HDR image(s) 305 may be upscaled. Then, in process blocks 611 and 613, the color signal is added back into the high resolution luminance image data 535 and the low resolution luminance image data 537. High resolution luminance image data 535 is combined with first color data (from the image data corresponding to the at least one LDR image) to form high resolution color image data. Low resolution luminance image data 537 is combined with second color data (from the image data corresponding to the at least one HDR image) to form low resolution color image data. In process block 643, high resolution luminance image data 535 and low resolution luminance image data 537 (with added color signals) are mixed in accordance with mixing mask 425. This results in the formation of composite image 645.

Figure 7:
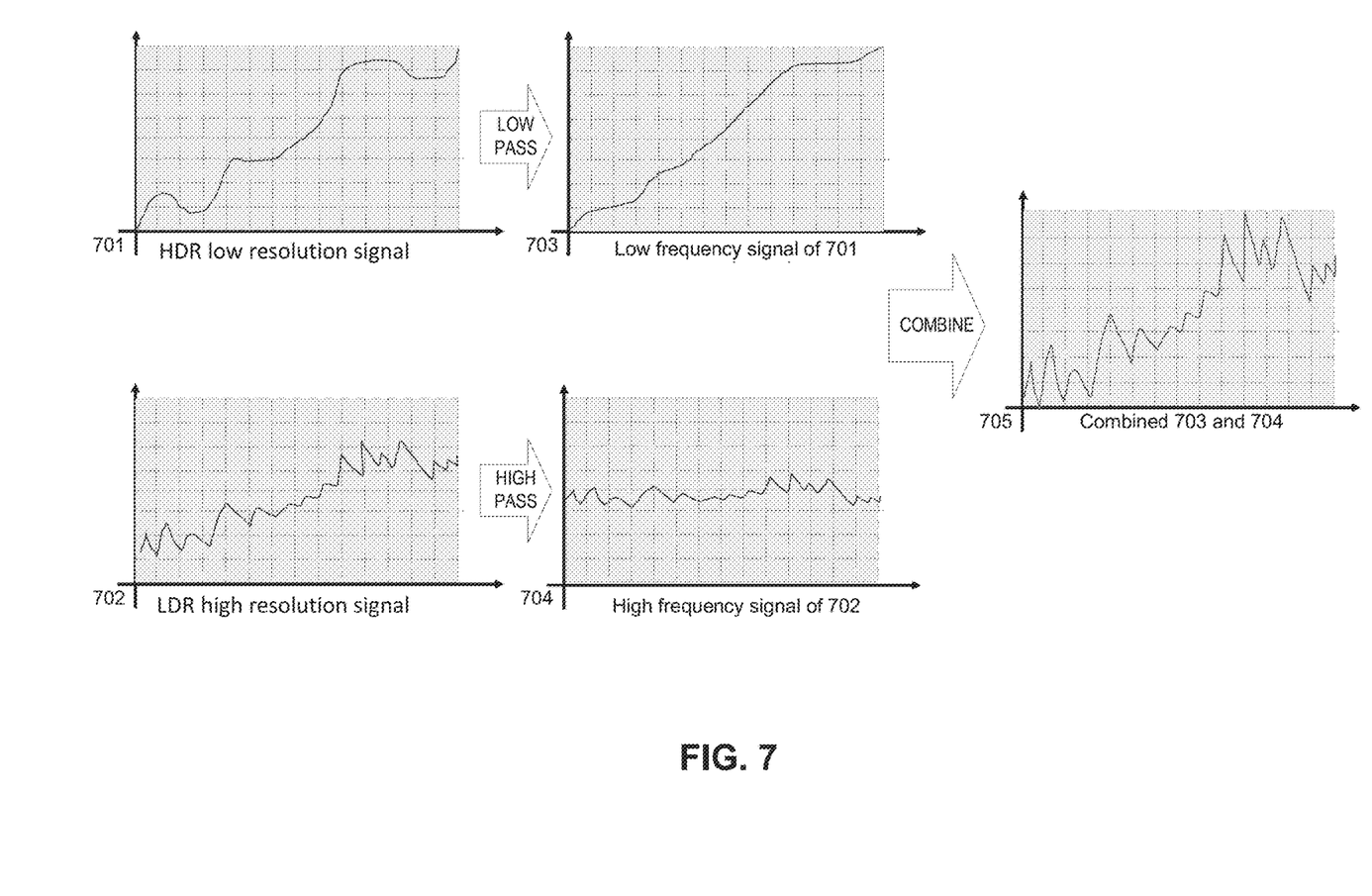
FIG. 7 depicts a simplified graphical representation of the method in FIG. 3, in accordance with the teachings of the present invention.

FIG. 7 depicts a highly simplified graphical representation of the method in FIG. 3. As shown, a low resolution HDR signal 701 is acquired (e.g., through capture of HDR image(s) 307), and an LDR high resolution signal 701 is acquired (e.g., through capture of LDR image(s) 305). Through a sequence of processing steps—which have been omitted for the purpose of simplification—a pure low frequency signal 703 and a pure high frequency signal 704 are created. These two signals are combined in graph 705 to achieve a signal with both high dynamic range and mid-range detail.

Figure 8:
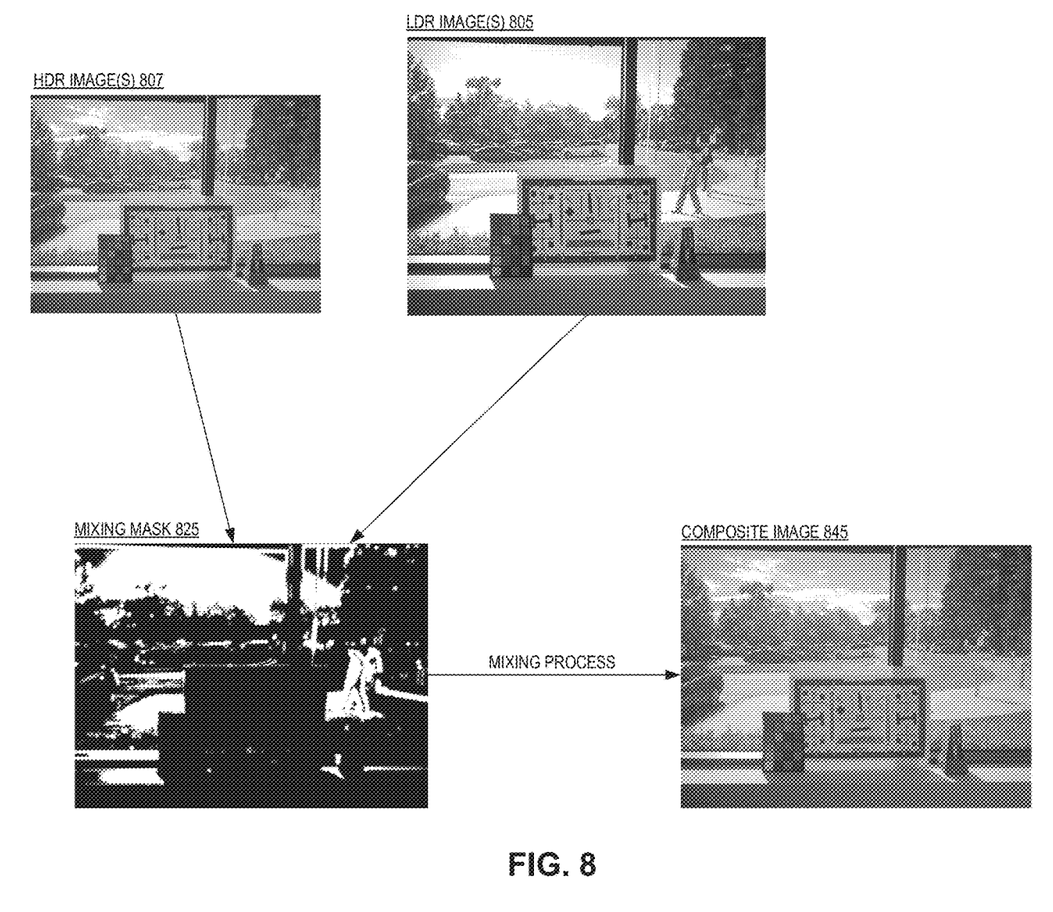
FIG. 8 depicts a simplified graphical representation of the method in FIG. 3, in accordance with the teachings of the present invention.

FIG. 8 depicts a simplified graphical representation of the method in FIG. 3. Specifically, FIG. 8 illustrates how the mixing mask may be used to blend the high resolution LDR signal with the low resolution HDR signal. HDR image(s) 807 and LDR image(s) 805 are captured and used to form mixing mask 825. It should be noted that the mixing mask shows (1) the differences between the HDR image(s) 807 and LDR image(s) 805; (2) oversaturation of the LDR image(s) 805; and (3) undersaturation of the LDR images(s) 805. For example, differences between the HDR image(s) 807 and LDR image(s) 805 include the people walking into the frame of the LDR image(s) 805. Accordingly, the mixing mask has whited-out the people so that the processor will know to remove this from the composite image 845. Furthermore, the sky in LDR image(s) 805 is oversaturated since no cloud detail is present in LDR image(s). Accordingly the mixing mask 825 has whited-out the sky so that the processor will know to replace the sky from the LDR image(s) 805 with the sky from the HDR image(s) 807. Subsequently, the mixing mask is used to form composite image 845 which includes all of the mid-range detail from LDR image(s) 805 and the high dynamic range of the HDR image(s) 807.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging system, comprising:
   an image sensor to capture a sequence of images including at least one low dynamic range (LDR) image and at least one high dynamic range (HDR) image;
   control circuitry and readout circuitry, wherein the control circuitry is coupled to the image sensor to control LDR image capture and HDR image capture, and wherein the readout circuitry is coupled to read out image data captured by the image sensor;
   a processor coupled to the readout circuitry to receive image data corresponding to the at least one LDR image and image data corresponding to the at least one HDR image, and wherein the processor is configured to:
   generate a mix mask;
   combine high frequency image data extracted from image data corresponding to the at least one LDR image with low frequency image data extracted from image data corresponding to the at least one HDR image; and
   generate a composite image from the low frequency image data and the high frequency image data, wherein the mix mask governs placement of the high frequency image data and the low frequency image data in the composite image; and
   a data output coupled to the processor to receive the composite image.

2. The imaging system of claim 1, wherein generating the mix mask includes using the processor to:
   determine differences between the low frequency image data and the high frequency data;

determine portions of the high frequency image data that are under-saturated;
determine portions of the high frequency image data that are over-saturated; and
generate the mix mask, wherein the mix mask shows differences between the low frequency image data and the high frequency image data, and wherein the mix mask shows portions of the high frequency image data that are over saturated and portions of the high frequency image data that are under saturated.

3. The imaging system of claim 2, wherein the portions of the mix mask that show differences between the low frequency image data and the high frequency image data are expanded.

4. The imaging system of claim 2, wherein generating the composite image includes using the mix mask to:
correct portions of the high frequency image data that are over saturated using the low frequency image data;
correct portions of the high frequency image data that are under saturated using the low frequency image data;
correct differences between the low frequency image data and the high frequency image data using the low frequency image data.

5. The imaging system of claim 1, wherein using the processor to combine the high frequency image data and the low frequency image data includes forming high resolution luminance image data, and low resolution luminance image data, wherein the high resolution luminance image data includes image data corresponding to the at least one LDR image and image data corresponding to the at least one HDR image, and wherein the low resolution luminance image data includes image data corresponding to the at least one HDR image.

6. The imaging system of claim 5, wherein the high resolution luminance image data is achieved by applying a high-pass filter to the image data corresponding to the at least one LDR image, and applying a low-pass filter to the image data corresponding to the at least one HDR image.

7. The imaging system of claim 5, wherein the low resolution luminance image data is achieved by sharpening the image data corresponding to the at least one HDR image.

8. The imaging system of claim 5, wherein the high resolution luminance image data is combined with first color data from the image data corresponding to the at least one LDR image to form high resolution color image data, and wherein the low resolution luminance image data is combined with second color data from the image data corresponding to the at least one HDR image to form low resolution color image data, and wherein the composite image is generated by combining the high resolution color image data and the low resolution color image data.

9. The imaging system of claim 1, wherein the image sensor is configured to capture N HDR images in a first frame and one LDR image in a second fame, wherein the N HDR images are $1/N^{th}$ a size of the one LDR image, and wherein the N HDR images are up-scaled to the size of the LDR image.

10. A method of image processing, comprising,
capturing a sequence of image data with an image sensor, wherein the sequence of image data includes image data corresponding to at least one low dynamic range (LDR) image and image data corresponding to at least one high dynamic range (HDR) image;
receiving the sequence of image data with a processor;
generating a mix mask;
combining high frequency image data extracted from image data corresponding to the at least one LDR image with low frequency image data extracted from image data corresponding to the at least one HDR image; and
generating a composite image from the low frequency image data and the high frequency image data, wherein the mix mask governs placement of the high frequency image data and the low frequency image data in the composite image.

11. The method of claim 10, wherein the generating the mix mask includes:
determining differences between the low frequency image data and the high frequency image data;
determining portions of the high frequency image data that are under-saturated;
determining portions of the high frequency image data that are over-saturated; and
generating the mix mask, wherein the mix mask shows differences between the low frequency image data and the high frequency image data, and wherein the mix mask shows portions of the high frequency image data that are over saturated and portions of the high frequency image data that are under saturated.

12. The method of claim 11, wherein the portions of the mix mask that show differences between the low frequency image data and the high frequency image data are expanded.

13. The method of claim 11, wherein using the mix mask to generate the composite image includes:
using the low frequency image data to correct portions of the high frequency image data that are over saturated;
using the low frequency image data to correct portions of the high frequency image data that are under saturated; and
using the low frequency image data to correct differences between the low frequency image data and the high frequency image data.

14. The method of claim 1, wherein combining the high frequency image data and the low frequency image data includes combining high resolution luminance image data and low resolution luminance image data, wherein the high resolution luminance image data includes image data corresponding to the at least one LDR image and image data corresponding to the at least one HDR image, and wherein the low resolution luminance image data includes image data corresponding to the at least one HDR image.

15. The method of claim 14, wherein the high resolution luminance image data is achieved by applying a high-pass filter to the image data corresponding to the at least one LDR image, and applying a low-pass filter to the image data corresponding to the at least one HDR image.

16. The method of claim 14, wherein the low resolution luminance image data is achieved by sharpening the image data corresponding to the at least one HDR image.

17. The method of claim 14, wherein the high resolution luminance image data is combined with first color data from the image data corresponding to the at least one LDR image to form high resolution color image data, and wherein the low resolution luminance image data is combined with second color data from the image data corresponding to the at least one HDR image to form low resolution color image data, and wherein the composite image is generated by combining the high resolution color image data and the low resolution color image data.

18. The method of claim 10, wherein capturing the sequence of image data includes:
capturing N HDR images in a first frame and one LDR image in a second fame, wherein the N HDR images are $1/N^{th}$ a size of the one LDR image; and
upscaling the N HDR images to the size of the one LDR image.

* * * * *

UNITED STATES PATENT AND TRADEMARK OFFICE
CERTIFICATE OF CORRECTION

PATENT NO. : 9,900,527 B2  
APPLICATION NO. : 15/064546  
DATED : February 20, 2018  
INVENTOR(S) : T. Uvarov et al.

Page 1 of 1

It is certified that error appears in the above-identified patent and that said Letters Patent is hereby corrected as shown below:

In the Claims

| Column | Line | Error |
|---|---|---|
| 9 (Claim 9, Line 3) | 51 | "second fame" should read --second frame-- |
| 10 (Claim 18, Line 4) | 62 | "second fame" should read --second frame-- |

Signed and Sealed this  
Third Day of July, 2018

Andrei Iancu  
*Director of the United States Patent and Trademark Office*